United States Patent [19]

Sheen

[11] Patent Number: 4,700,736
[45] Date of Patent: Oct. 20, 1987

[54] FAUCET VALVE

[76] Inventor: Guang-Yue Sheen, No. 5, Lane 215, Yung Ho Street, South District, Taichung, Taiwan

[21] Appl. No.: 547

[22] Filed: Jan. 5, 1987

[51] Int. Cl.$^4$ .............................................. F16K 43/00
[52] U.S. Cl. ................................ 137/315; 137/454.6; 251/287; 251/185
[58] Field of Search .................. 137/454.2, 454.6, 315; 251/287

[56] References Cited

U.S. PATENT DOCUMENTS

| | | | |
|---|---|---|---|
| 2,676,610 | 4/1954 | Hare | 137/454.6 |
| 3,889,923 | 6/1975 | Saville | 251/170 |
| 4,064,900 | 12/1977 | Schmitt | 137/315 |
| 4,331,176 | 5/1982 | Parkison | 137/454.6 X |

Primary Examiner—Harold W. Weakley
Attorney, Agent, or Firm—Morton J. Rosenberg

[57] ABSTRACT

A faucet valve comprising a removable cartridge which snaps into place, a taper-shaped insert that keys into a valve body and which fits tightly into a tapered annular ring. The lower portion of the cartridge has an external stop spanning over 90 degrees for stable stoppage of the faucet handle. The cartridge snaps together with the insert so that it can't fall out or become disengaged during assembly or normal usage. The insert has two straight projection keys which lock it into place on the valve body (i.e. prevent it from rotating on the valve body). The insert is tapered on its lower end so as to fit securely into a tapered annular ring. A locking cap secures the insert, and the pieces therein, in place vertically on the valve body.

1 Claim, 9 Drawing Figures

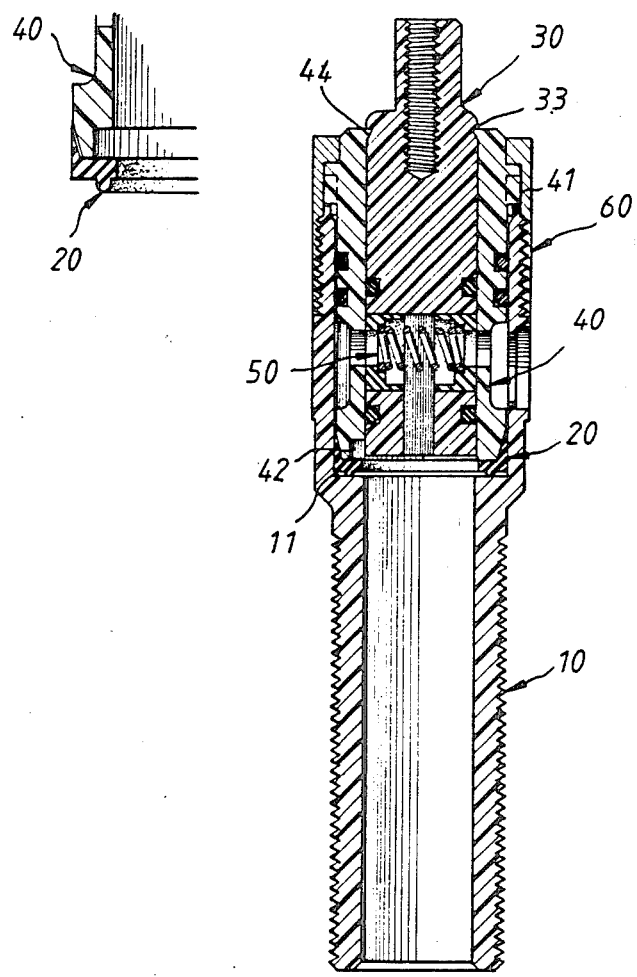

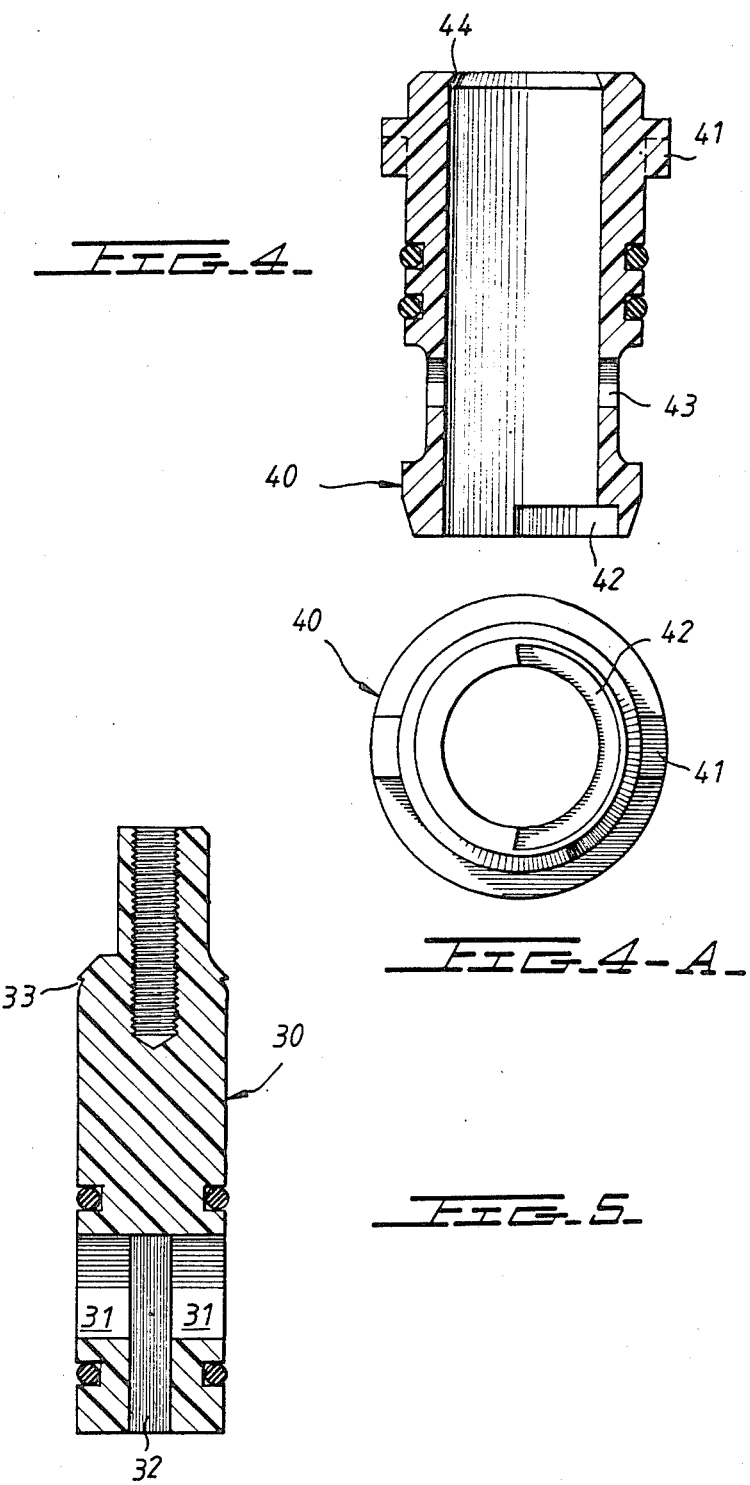

4,700,736

FAUCET VALVE

BACKGROUND OF THE INVENTION

This invention relates to an improved faucet valve. Previously, faucet valves often had one or more of the following drawbacks: (1) the removable cartridge would often fall through the body of valve while installing, which was inconvenient and irritating; (2) the inner components were not fixed together or were fixed together using some fixing means such as screws or dowels, which were not suited to such a small valve assembly; (3) the insert was not fixed, thereby allowing the openings on the outer surface of the insert to become disaligned; (4) the external stops for stopping the faucet handle were easily distorted when the faucet handle was turned too hard; and (5) the fit of the inner parts was not close enough and often allowed leakage therearound. For examples of prior art see Keller, III (U.S. Pat. No. 3,967,811) and Schmitt (U.S. Pat. No. 3,788,601).

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide external stops which are not easily distortable.

Another objective of this invention is to provide inner parts which snap together so that the removable cartridge can not slip out during installation of the valve.

A further objective of this invention is to provide an insert which locks into place on the body of the valve without screws, dowels, or the like.

Another objective of the present invention is to provide an insert with a tapered lower portion and complementary annular ring which allow for a closer fit for the parts of the valve and better sealing therein.

Further objectives and advantages of the present invention will become apparent as the following description proceeds, and the features of novelty which characterize the invention are pointed out with particularity in the claims annexed to and forming a part of this invention.

BRIEF DESCRIPTION OF THE DRAWINGS

FIG. 3 is a cross-sectional view of the present invention;

FIG. 3-A is a cross-sectional cutaway view of the insert and the annular ring, showing the angle of contact therebetween.

FIG. 4 is a cross-sectional view of the insert of the present invention;

FIG. 4-A is a bottom view of the insert of the present invention;

FIG. 5 is a cross-sectional view of the removable cartridge of the present invention, as seen with the main bore of the insert in a vertical orientation;

DETAILED DESCRIPTION OF THE PREFERRED EMBODIMENT

Figure 1:
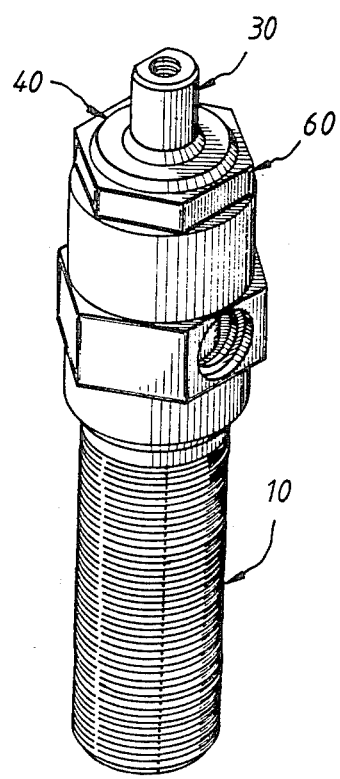
FIG. 1 is a perspective view of the present invention.

Referring to FIG. 1, it can be seen that the present invention 1 comprises a valve body 10 and a removable cartridge 30, which protrudes outward from the top of the body 10 so as to be engagable with a faucet handle (not shown). Although the outside of the invention looks similar to the prior art, it will be seen that the present invention 1 has definate characteristics which distinguish it from the prior art.

Figure 2:
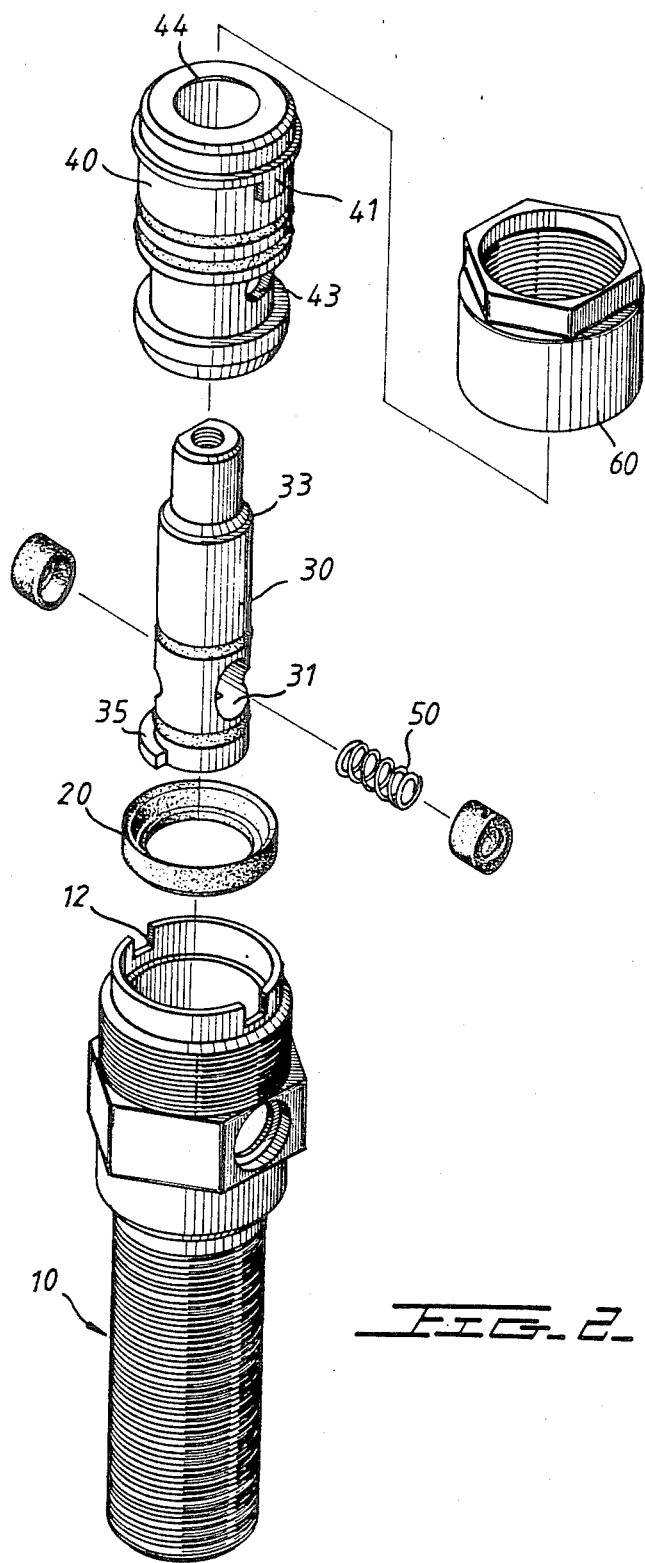
FIG. 2 is an exploded view of the present invention.

From FIG. 2, an exploded view of the present invention can be seen. A removable cartridge 30 fits into an insert 40, which in turn fits into the valve body 10. An annular ring 20 at the lower portion of the body 10 fits between the removable cartridge 30 and the body 10. Note that the annular ring 20 is tapered on both the upper inside diameter thereof and on the lower outer diameter thereof. This allows the cartridge 30, when inserted against the inside edge of the lower part of the body 10, to fit tightly therein. The insert 40 itself is secured in place by a locking cap 6 which threadedly engages with the top of the valve body 10.

In the present invention, the projections 41 on the insert 40, and the slots 12 on the body 10 fix the vertical position of the insert 40 with respect to the valve body 10. Since the removable cartridge 30 is snapped into place (by means of notched circular edge 33 and circular projection 13 on the valve body 10), it is also fixed in place vertically with respect to the valve body 10. In conventional faucet valves, the insert and the valve body are engaged by screw means, and the removable cartridge does not lock into the insert, therefore the relative vertical position of the insert and the removable cartridge were often inaccurate. This lead to problems with the main bore and the main port of the insert and the main port of the valve body lining up accurately.

FIG. 3 shows all the parts in assembled position, excluding the locking cap 6. Note that the notched circular edge 33 snaps into the end of the removable cartridge 30. The notched circular edge 33 can be seen more clearly in FIGS. 5 and 6 on the upper end of said removable cartridge 30. The insert 40 has a circular projection 13 which snaps together with the notched circular edge 33. The annular ring 20 fits between the removable cartridge 30 and the insert seat 11. The annular ring 20 is made of a rubber or rubber-like material, so as to allow an interference fit between the removable cartridge 30 and the insert seat 11. This not only provides an extra sealing piece in the present valve 1 but also allows for a closer and more exact fit than was available in the prior art. There is a spring 50 in the main bore 31 and a supply port 32 connecting with the main bore 31, but as this construction represents no improvement over the prior art it need not be discussed herein.

FIG. 3-A shows a close-up cross-sectional view of the point of contact between the insert 40 and the annular ring 20. Note that the slope of the inner surface of the annular ring 20 and the outer surface of the insert 40 are not the same. This is important in the case where there are inaccuracies in the manufacture of the body. Specifically, if the the bore which receives the insert 40 and the annular ring 20 is too deep or not deep enough, then the differing slopes of the insert 40 and the annular ring 20 can compensate therefor. If the bore is too deep, then the insert 40 simply fits into the annular ring 20 and contacts at a higher point thereon. If the bore is too shallow, then the insert fits into the annular ring 20 at a lower point thereon. Since the annular ring 20 is made out of a resilient and mouldable material, a small overlap between the two pieces is possible, hence allowing the insert 40 to fit tightly into the annular ring while still providing good sealability.

Now referring to FIG. 4, another feature of the present invention can be seen. The insert 40 has two projections 41 which fit into two corresponding slots 12 on the top portion of the body 10 (as seen in FIG. 2). These projections 41 allow the orientation of the insert 40 with respect to the body 10 to remain in a fixed (i.e. 'lock-in') position. It is important that no threads are needed on the insert 40 or the body 10 to fix the insert 40, as the machining involved in threading is expensive and labor-intensive. Also, this type of 'lock-in' method, using a certain number of projections, is easier and faster to assemble. Simply line up the projection 41 and the slots 12 (see FIG. 2) and insert. In prior art, the insert screwed into the body 10. Therefore, if the insert were not screwed in exactly the right manner it would be fixed too high or too low with respect to the body 10. This in turn, would cause problems with respect to alignment of the insert 3, the removable cartridge 30, and the port of the body 10.

Figure 6:
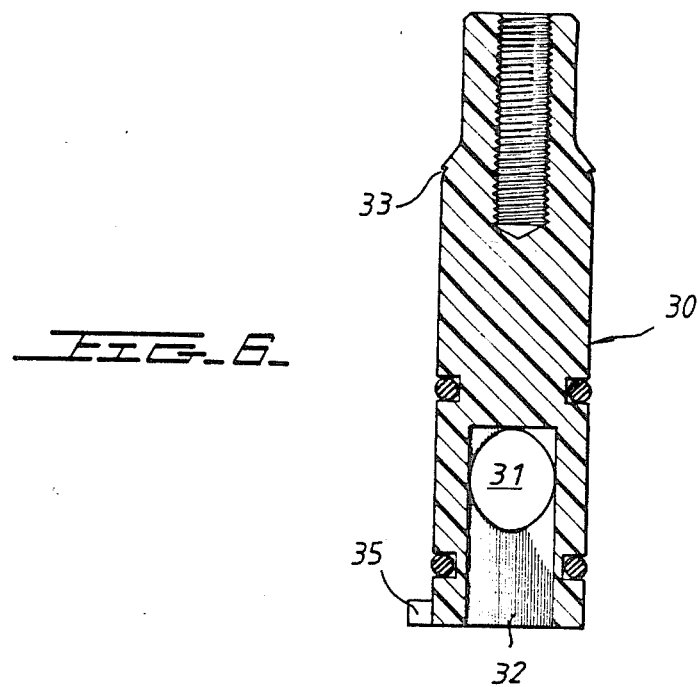
FIG. 6 is another cross-sectional view of the removable cartridge of the present invention as seen looking along the lengthwise axis of the main bore of the insert (i.e. 90 degrees from the orientation seen in FIG. 5).
Figure 7:
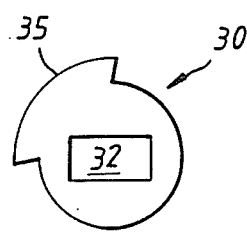
FIG. 7 is a bottom view of the external stop.

Referring to FIGS. 6 and 7, the external stop 35 of the removable cartridge 30 can be clearly seen. FIG. 6 shows the external stop 35 and FIG. 7 shows the bottom surface thereof. Of course, the external stop 35 fits into the cavity 42 of the insert 40 (see FIG. 4 and FIG. 4-A). However, the external stop has a slightly greater than 90 degree (obtuse) span so as to provide structural rigidity which would otherwise not be available, especially in plastic structures. This unique construction of the cavity 42 and the external stop 35 also prevents another problem found in prior art. Namely, this problem is that in the prior art, the cavity and external stop were disposed in the upper wall of the insert. Since the insert and the parts therein were made by mould injection, the inner wall of the insert 40 was easily scratched when removing the mould from the insert 40. These scratches reduced the sealability and lifespan of the O-rings on the removable cartridge 30. In the present invention, this drawback is eliminated, since the mould for forming the cavity is already at the bottom of the insert 40. Accordingly, the mould does not scratch up the inner wall of the insert 40 when being removed.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. An improved faucet valve comprising:
   (A) a body having a multiplicity of slots on the top end thereof;
   (B) a removable cartridge having a notched circular edge on the upper end thereof, and an external stop of obtuse span on the bottom end thereof;
   (C) an insert having a multiplicity of projections on the top end, and a tapered lower end; said projections corresponding to and fitting into said slots on the top end of said body so as to secure the insert and so as to fix the orientation of the insert with respect to the body; said insert having a circular projection which snaps together with said notched circular edge; and
   (D) a tapered annular ring; said annular ring fitting in between an insert seat on said body and said insert; the upper inner diametral surface of said annular ring being tapered so as to receive said tapered lower end of said insert; and said annular ring being made of rubber or rubber-like material.

* * * * *